United States Patent [19]
Bartasis et al.

[11] Patent Number: 5,891,497
[45] Date of Patent: Apr. 6, 1999

[54] IN-LINE/ON DEMAND REACTION DELIVERY METHOD

[75] Inventors: James E. Bartasis, Hampshire; Barry Edward Carter Williams, Sterling, both of Ill.

[73] Assignee: FBC Industries, Inc., Rolling Meadows, Ill.

[21] Appl. No.: 968,619

[22] Filed: Nov. 12, 1997

Related U.S. Application Data

[62] Division of Ser. No. 736,794, Oct. 25, 1996, Pat. No. 5,738,772.

[51] Int. Cl.⁶ .......................... A01K 43/00; G01N 33/02
[52] U.S. Cl. .......................... 426/231; 426/74; 426/654; 422/62; 422/82.02; 436/20; 436/55; 99/285; 99/325; 99/468; 99/486
[58] Field of Search .............................. 426/74, 533, 648, 426/231, 654, 62, 82.02; 436/20, 55; 99/285, 325, 468, 486

[56] References Cited

U.S. PATENT DOCUMENTS

| | | | |
|---|---|---|---|
| 2,567,445 | 9/1951 | Parker | 426/231 |
| 3,554,113 | 1/1971 | Page et al. | 99/534 |
| 3,677,467 | 7/1972 | Whitesell | 204/534 |
| 4,011,260 | 3/1977 | Goldkamp et al. | 99/534 |
| 4,112,131 | 9/1978 | Bosy et al. | 426/58 |
| 4,514,094 | 4/1985 | Buckholz, Jr. et al. | 99/486 |
| 4,563,361 | 1/1986 | Hörig | 426/231 |
| 4,669,081 | 5/1987 | Mack | 118/691 |
| 4,674,440 | 6/1987 | Cardin et al. | 118/688 |
| 4,820,540 | 4/1989 | Baudahn | 99/453 |
| 5,344,491 | 9/1994 | Katou | 118/695 |
| 5,368,715 | 11/1994 | Hurley et al. | 204/232 |
| 5,458,909 | 10/1995 | Sevenich | 426/582 |
| 5,466,477 | 11/1995 | Sevenich | 426/582 |
| 5,484,626 | 1/1996 | Storjohann et al. | 118/688 |
| 5,505,979 | 4/1996 | Sevenich | 426/582 |
| 5,643,797 | 7/1997 | Schmidt et al. | 436/55 |

*Primary Examiner*—Nina Bhat
*Attorney, Agent, or Firm*—Rockey, Milnamow & Katz, Ltd.

[57] ABSTRACT

An on-line method for the continuous generation of alkali metal salts includes continuously reacting a source of acidity, a liquid having a low pH value, with a source of alkalinity, a liquid having a high pH value, while continuously monitoring an electrical parameter of the resultant in salt which is indicative of its pH value. The monitored value is used to adjust the relative flow rates of the input liquids so as to dynamically maintain the pH value of the resultant salt within a predetermined range. In the apparatus, the input liquids can be continuously supplied to a reacting element and the conductance of the resultant salt monitored for purposes of providing feedback control signals to adjust one or more flow rates.

16 Claims, 8 Drawing Sheets

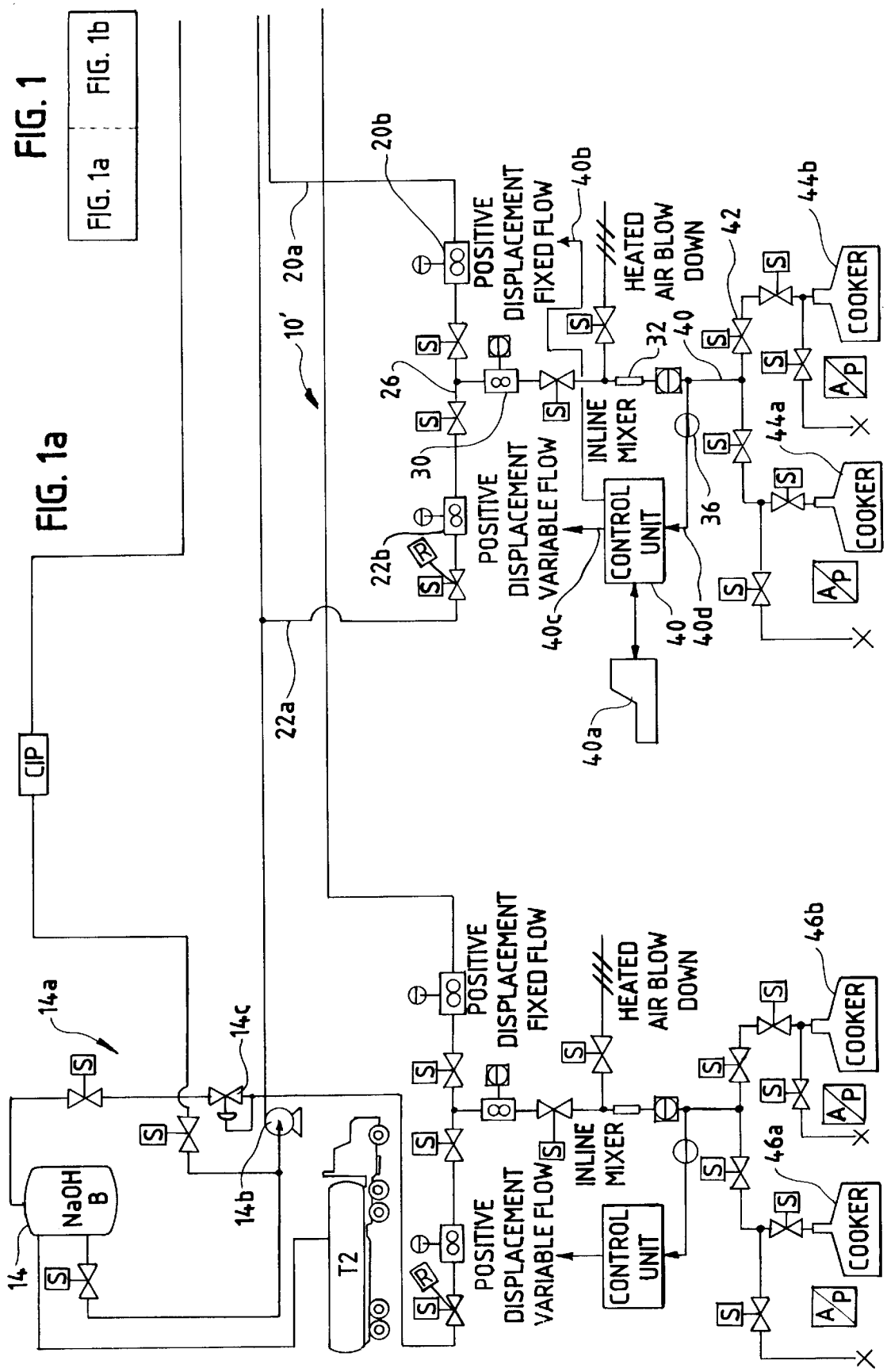

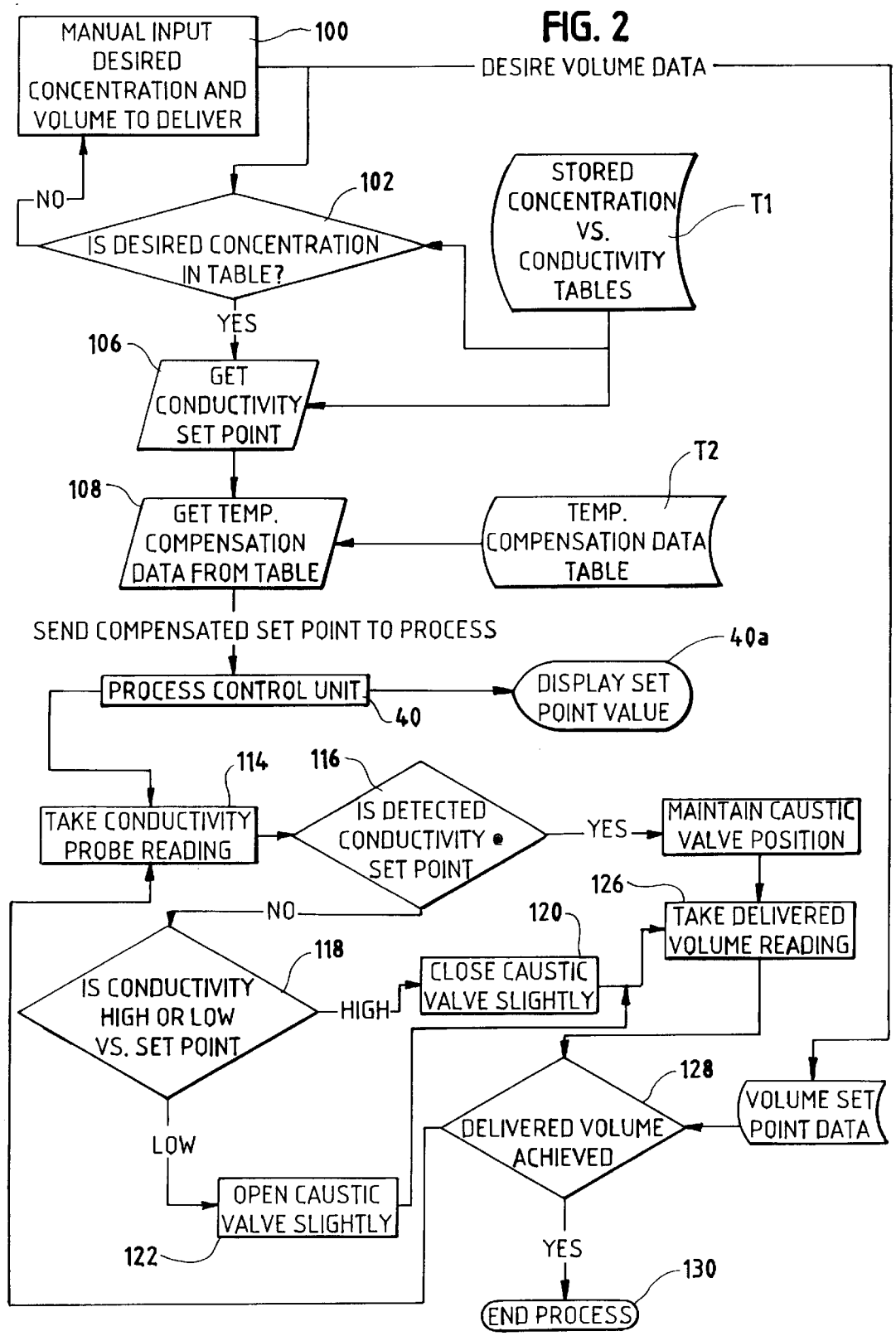

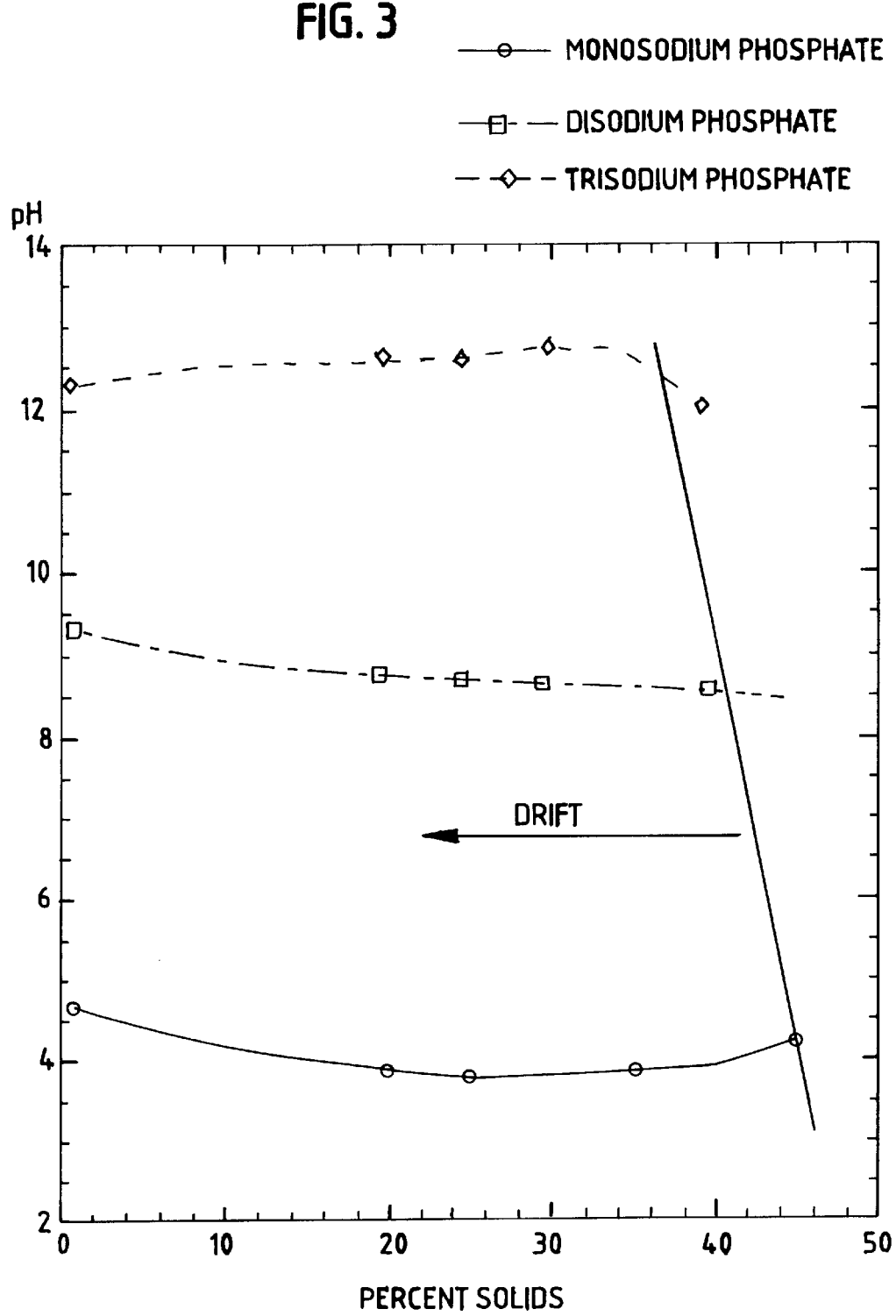

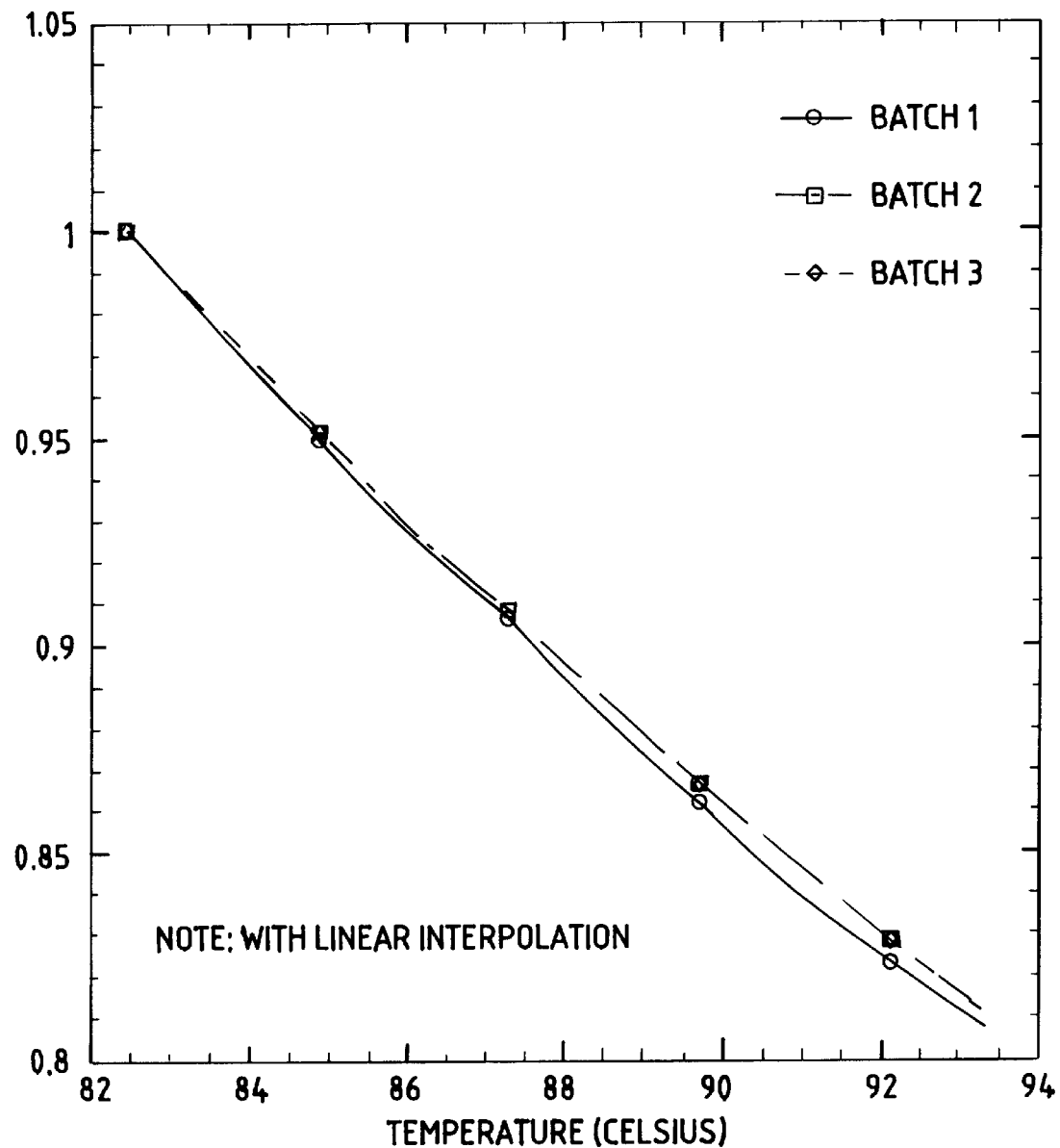

IN-LINE/ON DEMAND REACTION DELIVERY METHOD

This application is a division, of application Ser. No. 08/736,794, filed Oct. 25, 1996, U.S. Pat. No. 5,738,772.

FIELD OF THE INVENTION

The invention pertains to processes and methods for producing alkali metal salts. More particularly, the invention pertains to apparatus and methods for in-line high volume and continuous production of salts usable as emulsifying agents in food products.

BACKGROUND OF THE INVENTION

The use of alkali metal salts as emulsifying agents in connection with the processing of food products is known. Representative emulsifying agents include sodium phosphates, polyphosphates and citrates which are often used in connection with the manufacture of process cheese.

It is known to use monosodium phosphate ($NaH_2PO_4$) (MSP), disodium phosphate ($Na_2HPO_4$) (DSP) as well as trisodium phosphate ($Na_3PO_4$) (TSP) in connection with process cheese manufacturing. Similarly, it is known to use sodium and potassium citrates as emulsifying agents in connection with the manufacture of dairy products and process cheese.

The publication *Process Cheese* which bears a copyright date of 1992, published by D. Cooley & Co., Inc. describes, Page 47 and 48, the process of titrating phosphoric acid with a base so as to produce various salts. More particularly, MSP, DSP or TSP or blends thereof can be manufactured in accordance with the teachings of the above-noted publication by reacting phosphoric acid as ($H_3PO_4$) well as MSP, DSP, TSP or blends thereof with a source of alkalinity such as sodium hydroxide, sodium carbonate or mixtures thereof.

As is known, the process involves a sequential substitution of a hydrogen atom with a sodium atom to produce respectively MSP, DSP and TSP. It is also known to carry out the reaction in distinct batch steps.

Phosphoric acid can be reacted with sufficient sodium hydroxide to produce MSP. The MSP can be stored in liquid form at the premises of the salt manufacturer or at the premises of the cheese processor.

The liquid MSP can be withdrawn from a storage tank and reacted with additional sodium hydroxide on the batch basis to produce DSP or TSP or a blend thereof. The batch produced salt, at an appropriate pH value can then be introduced into the cheese processing as is known to those of skill in the art.

Batch processing of DSP and TSP, or blends thereof, while useful and effective in cheese processing, inherently has limitations with respect to smoothness of texture, flavor, metalability, softness, slice separation and the like in the final cheese product. It would be desirable to overcome and improve upon the known process.

Thus, there continues to be a need for improved devices and methods of creating emulsifying agents useable as food additives so as to improve the uniformity and consistency of the final processed food product. Preferably, such devices and methods would be incorporatable into existing manufacturing systems, used for example, to manufacture process cheese, without having to provide extensive and expensive additional processing equipment. Preferably, such improved devices and methods would also contribute to a reduction in the manufacture of excessive amounts of emulsifying agents which in turn will help reduce the cost of the final process cheese product to the ultimate consumer.

SUMMARY OF THE INVENTION

In accordance with the invention, a system and a method are provided which incorporate in-line, continuous, real-time reacting of a selected acid or liquids having low pH values with a source of alkalinity in combination with substantially continuous feedback and control of the characteristics of the resultant salts. These salts can in turn be provided, on a continuous basis, to a food process. In accordance with the present invention, the pH value of the resultant salt can be controlled using a feedback loop by continuous, real-time monitoring of an conductance parameter, indicative of pH of the resultant salt which is simultaneously being provided to the food process. Temperature can also be continuously monitored in real-time.

In one aspect of the invention, the system can include first and second sources, or storage tanks, of an acid or a liquid having a selected, low, pH value and a source of alkalinity respectively. In accordance with the present invention, both the initial source of acidity and the source of alkalinity are in liquid form.

The present system provides for continuous, real-time reacting of the two starting liquids so as to carry out, for example, a selected sequential hydrogen substitution with sodium (or perhaps potassium) ions. The reaction takes place in real-time on a continuous basis and in an in-line reacting element.

A selected electrical parameter indicative of pH, conductance, of the liquid outflow of the mixing element, is monitored in real time and used to dynamically vary the volumes and/or rates of the input liquids so as to maintain continuously and in real-time, a desired pH value in the resultant output salt. In another aspect of the invention, the pH value can be maintained in a range of 4.1 to 12.2.

The output salt can then be immediately delivered, in real-time, to a respective food processing vessel. Alternately, the salt can be delivered to a tank or the like for storage and subsequent use.

In accordance with the present system and method, acids such as phosphoric acid or citric acid or pre-processed, low pH liquids such as MSP, can be used as the input source of acidity to be reacted with a respective source of alkalinity in the on-line mixing element.

In yet another aspect of the invention, a programmable control unit, which might incorporate a microcomputer or the like, can be incorporated into the system for the purpose of carrying out a substantially continuous sampling of the parameter value of the output salt. Outputs from the control unit can in turn be used on a real-time basis to adjust rates and flows of one or both of the input liquids.

As an alternate to programmable control units, hard-wired digital or analog control systems could be used to implement the control process on a continuous or a sampling basis.

In yet another aspect of the invention, a plurality of control parameters can be stored in a single control unit, such as a programmable processor so as to be able to provide, in response to operator input, a plurality of different output salts. In addition to dynamically controlling the characteristics and quantity of the output salts, in yet another aspect of the invention, real-time feedback can be provided to an operator as to the status and condition of the system.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 1, 1a and 1b are an overall diagrams of a system in accordance with the present invention;

FIG. 2 is a flow diagram of a method in accordance with the present invention;

FIG. 3 is a graph of pH vs. concentration for MSP, DSP, TSP;

FIG. 7 is a temperature compensation graph for compensation factor with linear interpolation.

DETAILED DESCRIPTION OF THE PREFERRED EMBODIMENTS

Figure 1B:
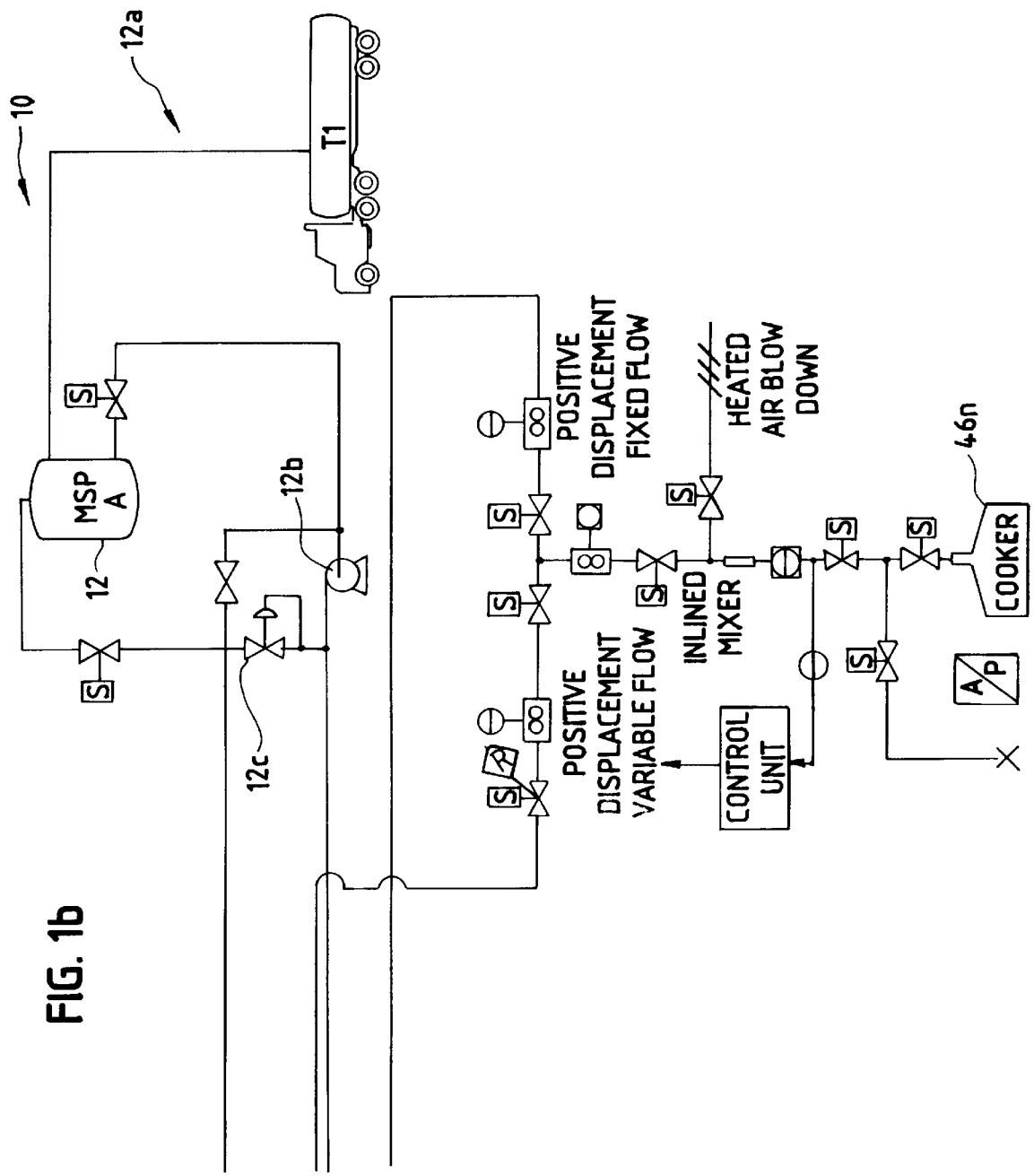

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a system 10 in accordance with the present invention. The system 10 incorporates first and second storage units or tanks 12, 14.

The tank 12 is, for example, used to store a source of liquid acidity "A" such as a citric acid, or a phosphoric acid. It can also be used to store a partially processed starting liquid such as MSP.

The-tank 14 is used for purposes of storing a source of alkalinity "B" such as sodium hydroxide or another suitable base.

Each of the tanks 12, 14 can be refilled as needed from a respective tank truck or rail car T1, T2. Each of the tanks 12, 14 has associated therewith a respective constant pressure header loop 12a, 14a.

Each of the header loops, 12a, 14a includes an associated pump 12b, 14b and a back pressure regulating valve 12c, 14c. The valves 12c, 14c can be for example Model Number 6871/K21.

Other valves or control elements can be provided in connection with the header loops 12a, 14a as would be known to those of skill in the art. It will be understood that the exact details of those header loops are not limitations of the present invention.

The outputs from each of the respective header loops, via conduits 20a and 22a are streams of the two liquids A, B to be reacted together. Each of the liquids is under a constant pressure determined by the respective header loops 12a, 14a. The liquid streams are reacted under the control of a closed loop feedback system 10'.

Each of the conduits is coupled to a respective flow control element 20b, 22b in the system 10'. For purposes of describing the best mode and not by way of limitation, flow control element 20b is a fixed flow control element which provides delivery of a preset volume at a preset rate to a "T" 26.

An output port of the "T" 26 is coupled to a flow meter 30. Also coupled as an input to the "T" 26 is a variable flow control element 22b which is in turn coupled to the conduit 22a.

Liquids A, B are combined in "T" 26, flow through the flow meter 30 and into reacting element 32. Element 32 is a 12 inch or larger in-line mixer which provides, in effect, a dwell time to permit the desired reaction to run to completion. In element 32, the liquids A and B react so as to produce an output salt which is intended to have a predetermined pH value. Dynamic, real-time sampled or continuous control over the output liquid from the mixing element 32 is achieved by monitoring the conductance thereof in a conductivity measuring element 36. One usable conductance meter is model 672E sold by Great Lake Instruments.

Surprisingly, the conductance parameter provides, as discussed subsequently, a reliable, dynamic real-time indicator of the pH value of the output liquid. Other electrical parameters related to the pH value of the output salt could be monitored without departing from the spirit and scope of the present invention.

An output signal from the measuring element 36 is coupled to a control unit 40 which in turn provides input control signals to the variable flow control element 22b. The control unit 40 could include a programmable processor or hard wired digital or analog circuitry.

As the salt produced from the reaction of liquids A, B flows out of the mixing element 32, the conductance thereof, whether sampled or measured continuously and in real-time, provides appropriate feedback signals, which in turn produce control signals to the flow control element 22b to continuously produce a salt having the desired pH value in a selected range such as 4.1 to 12.2.

The output salt is coupled via a conduit 40 and appropriate valuing 42, as would be known to one of skill in the art, to one or more food processing units 44a, b. These units could be cheese processors or cookers wherein the respective salt is combined with other food precursor ingredients to produce a desired food product. One possible food product producible with a system such as a system 10, is process cheese. Alternately, other ingredients can be combined with the salts eliminating from the reacting element 32 to produce different food products without limitation. Further, the system 10 could be used to produce non-food alkali metal salts for use in industrial processes.

As will be understood by those of skill in the art, multiple food processing vessels, 46a . . . n can be operated in parallel using multiple closed loop control systems, comparable to the control system 10' previously discussed. Where control unit 40 is programmable, multiple sets of parameters can be pre-stored to produce multiple different output salts in accordance with a selection by an operator.

FIG. 2 is a flow diagram illustrating the steps of a method in accordance with the present invention. In an initial step 100 the desired concentration of output additive or salt as well as desired volumes are entered perhaps via keyboard and display unit 40a. In a step 102, a prestored table T1 is checked to establish whether or not the desired concentration of the output salt is present in the table. If not, the method returns to step 100 wherein a message could be provided via the input output device 40a.

If the desired concentration is located in the Table T1, the table is accessed and the corresponding conductivity set point is obtained in a step 106. In a step 108, temperature compensation information is then obtained from a prestored Table T2.

Once the compensated set point value is obtained in the step 108, the control unit 40 can then initiate the process by sending control signals on lines 40b and 40c respectively to the fixed flow control element 20b and the variable flow control element 22b. At the same time the pumps 12b and 14b for the respective constant pressure control loops 12a and 14a are energized thereby producing the above described streams of fluids A and B which come together at the "T" 26 and are in turn reacted in the reaction element 32 to produce the flow of output salts in the conduit 40. At the same time, in a step 114 the conductivity of the output salt is measured and fed back to the control unit 40 via a line 40d. In a step 116, the conductivity value fed back on the line 40d is compared to the previously established set point obtained from the step 108. If the detected conductivity corresponds to the pre-established set point conductivity, no further adjustments are made to the variable flow displacement element 22b.

In the event that the detected conductivity does not correspond to the set point, in a step 118 a determination is made as to whether the conductivity is above or below the pre-established set point. If above, in a step 120, the variable flow control element 22b is adjusted a predetermined amount so as to reduce the flow of liquid B. Conversely, if the feedback conductivity value is below the pre-established set point, in a step 122 the variable flow control element control 22b is caused to open a predetermined amount so as to increase the flow of liquid B thereby raising the pH value of the output salt.

In step 126 a reading is taken of delivered output volume. The output volume of the produced salt could be delivered into one or more of the cookers, such as the cookers 44a, 44b or could be delivered to a storage tank for temporary storage before either further processing or use.

In a step 128, a determination is made based on the previously entered volume information as to whether the desired volume has been delivered. If so, the process can be terminated in an orderly fashion in a step 130. If not, further readings of the conductivity of the output salt are taken again in step 114 and the control process continues until the pre-established volume of output salt has been delivered.

By way of illustrating how the information for Table T1 is determined, reference is made to the graph of FIG. 3. In FIG. 3, pH values are plotted against percent solids for MSP, DSP and TSP. As illustrated in FIG. 3, there is a significant differential in pH values for the MSP and TSP. However, it has been determined that given the essentially zero slope associated with the curve for DSP over the range of interest, in excess of 30% solids, along with the difficulty of directly measuring small pH values in a range of 12 due to hydrolyzing of water by the TSP, along with a drift in performance of instruments for measuring small pH values, that direct measurement of pH values in the present circumstance is an approach which is not preferred.

Figure 4:
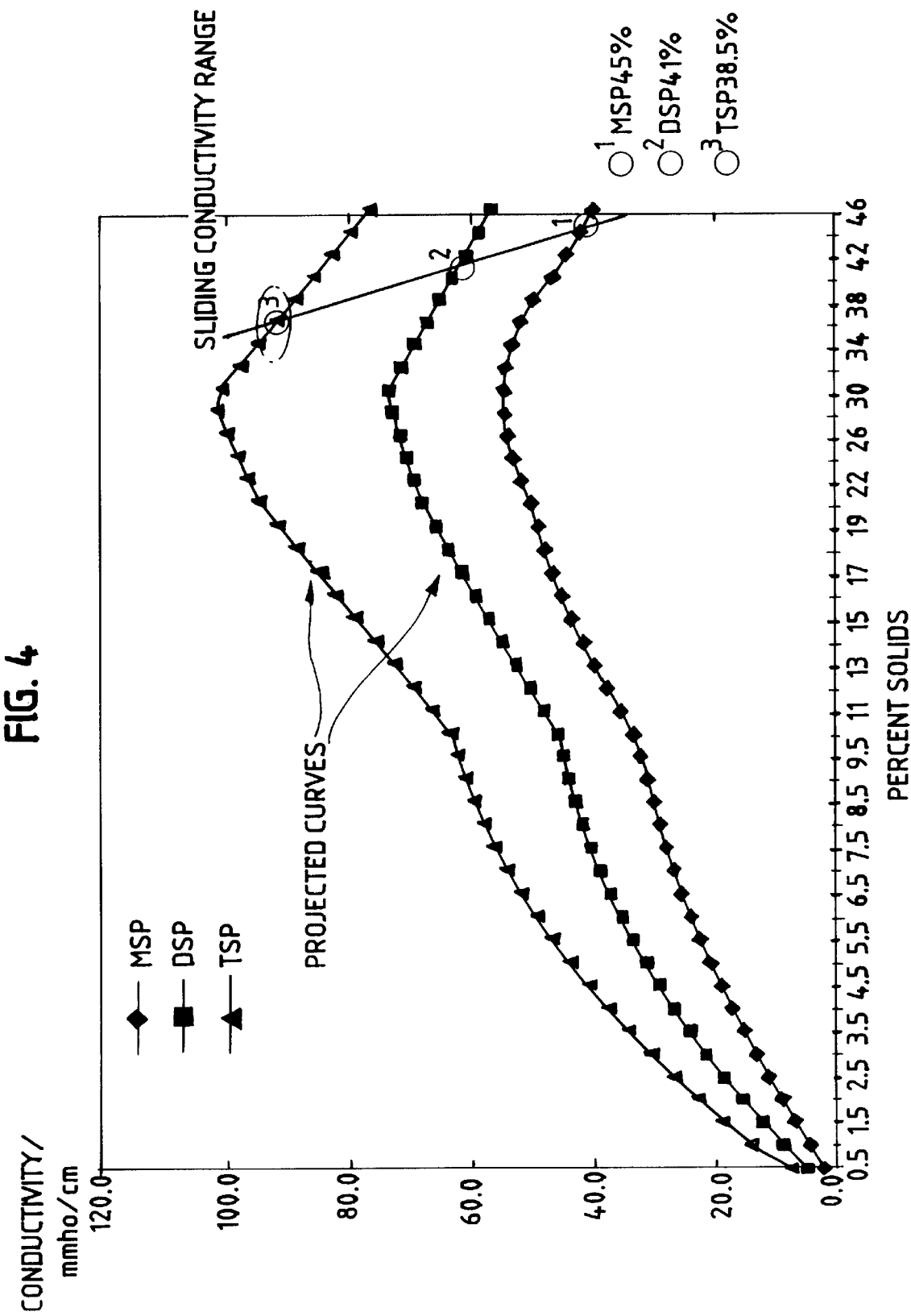
FIG. 4 is a graph of conductivity vs. concentration for MSP, DSP, TSP, with curves drawn through measured data points.

A preferred alternate, using conductivity measurements is illustrated by Tables 1A, 1B and the graph of FIG. 4 (Conductivity vs. Percent Solids).

TABLE 1A

| DISODIUM PHOSPHATE 41% (40.955%) CHEMICAL FORMULA: $Na_2HPO_4$ | | | |
|---|---|---|---|
| RAW MATERIAL | M. W. | ADJ. WT. | % (WT./WT.) |
| Monosodium Phosphate 45% | 119.98 | 266.622 | 76.92 |
| NaOH 50% | 40.00 | 80.00 | 23.08 |

TABLE 1B

| TRISODIUM PHOSPHATE 38.5% (38.4275%) CHEMICAL FORMULA: $Na_3PO_4$ | | | |
|---|---|---|---|
| RAW MATERIAL | M. W. | ADJ. WT. | % (WT./WT.) |
| Monosodium Phosphate 45% | 119.98 | 266.622 | 62.496 |
| NaOH 50% | 40.00 | 160.00 | 37.504 |

As illustrated in Table 1A, a pre-determined amount of 45% MSP, at a known conductivity, is reacted with a pre-determined amount of 50% NaOH at a ratio of MSP-:NaOH of 3.333:1 (WT/WT). This in turn produces 41% DSP at a known conductivity.

As illustrated in Table 2B, a pre-determined amount of 45% MSP, again having a known conductivity is reacted with a pre-determined amount of 50% NaOH. In this case, the ratio of MSP to NaOH is 1.666:1 (WT/WT). This results in a 38.5% TSP at a known conductivity.

As a result of the above-described steps, one obtains 45% MSP with a known conductivity, 41% DSP with a known conductivity and 38.5% TSP with a known conductivity. These three phosphates are represented on the graph of FIG. 4 as data points 1, 2, and 3. Given the above-noted ratios, no other products will be present other than the aforementioned.

The three data points, as illustrated in FIG. 4, all lie substantially along a straight line. Hence, adding 50% NaOH to 45% MSP results in a process of moving from data point 1, to data point 2, to data point 3. There is thus, a single conductivity reading for any phosphate ratio that lies along the noted sliding conductivity line of FIG. 4. The data points noted in FIG. 4 are all located on regions of substantial slope for each of the phosphates, thereby providing substantial and detectable variations in conductivity for control purposes. This also makes it possible to take into account variances in raw material concentrations.

Using the above-described process, set point information for Table T1 can be established. Instead of prestoring Table T1, the equation off of FIG. 4 could be executed each time a pH value is set, to determine the respective conductivity.

Temperature compensation values for Table T2 for a specific conductivity can be established using predetermined temperature coefficients. Such temperature coefficients represent a percent change of measured conductivity per degree Centigrade (° C.). In this regard, the measured conductivity for a given electrolytic fluid will vary with the temperature thereof. Such temperature coefficients can be linear or non-linear functions.

In one aspect, for example, at 25° C. a pre-determined concentration of DSP would have a measurable conductance characteristic. Increasing the temperature by 10° C. will result in a different conductance parameter.

The difference between the two measured conductance parameters can be obtained. A first order temperature coefficient can be established by dividing the difference by ten (10) for that particular range of that fluid. Further investigation would establish whether it was desirable to use a non-linear rather than a linear coefficient over the range.

Sample rates for the conductance measurement can, for example, be set to have a period of 0.1 seconds and provide an acceptable quality of output salt.

Figure 5:
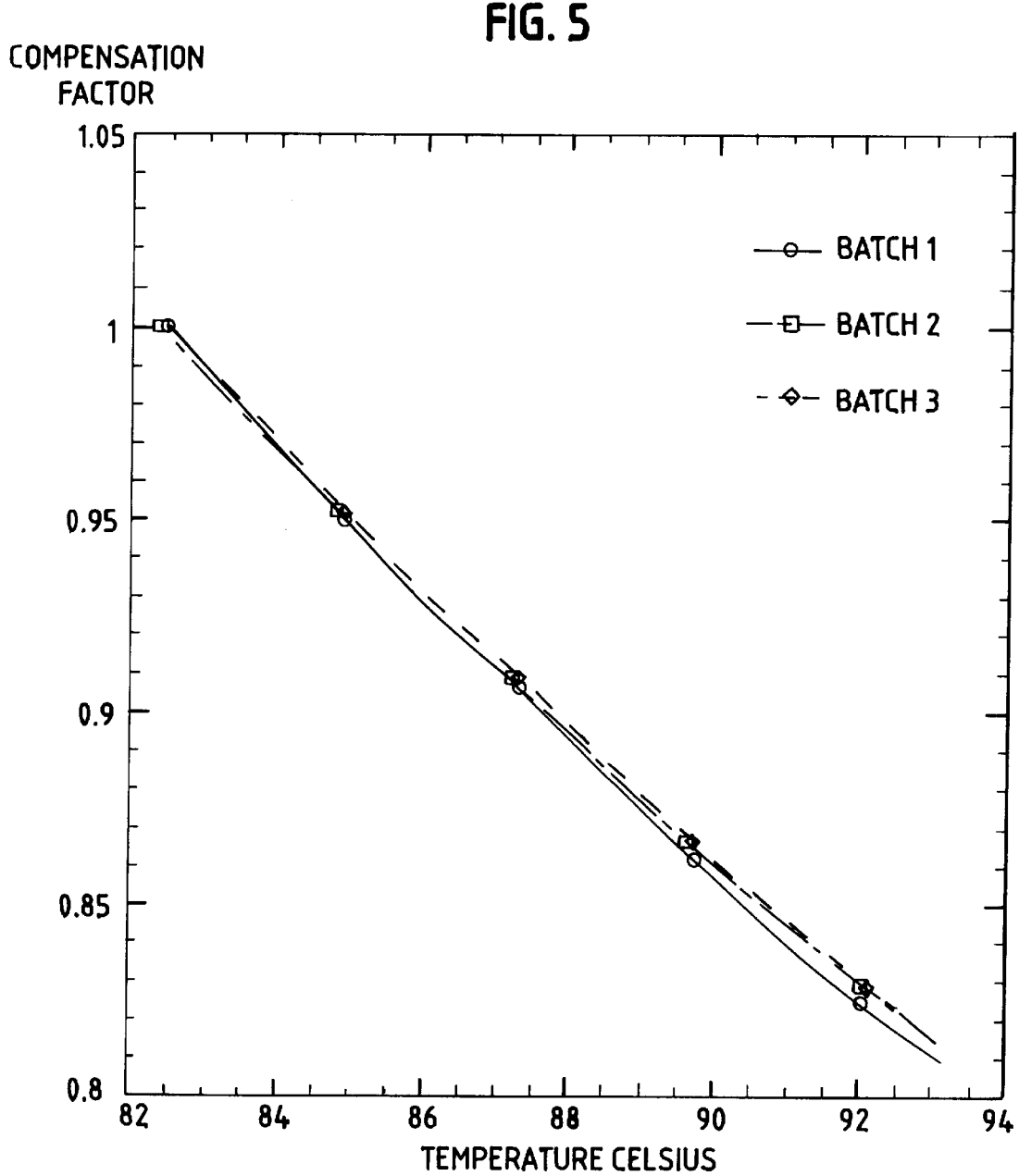
FIG. 5 is a temperature compensation graph for compensation factors.

FIG. 5 illustrates a substantially linear relationship between compensation factor and temperature for example, for three different concentrations of materials such as monosodium phosphate. Hence, a given conductivity reading can be normalized, and the temperature effects removed, by multiplying the raw conductivity readings from the meter 36 by a compensation factor associated with the temperature present in the outflow from the mixing element 32.

Figure 6:
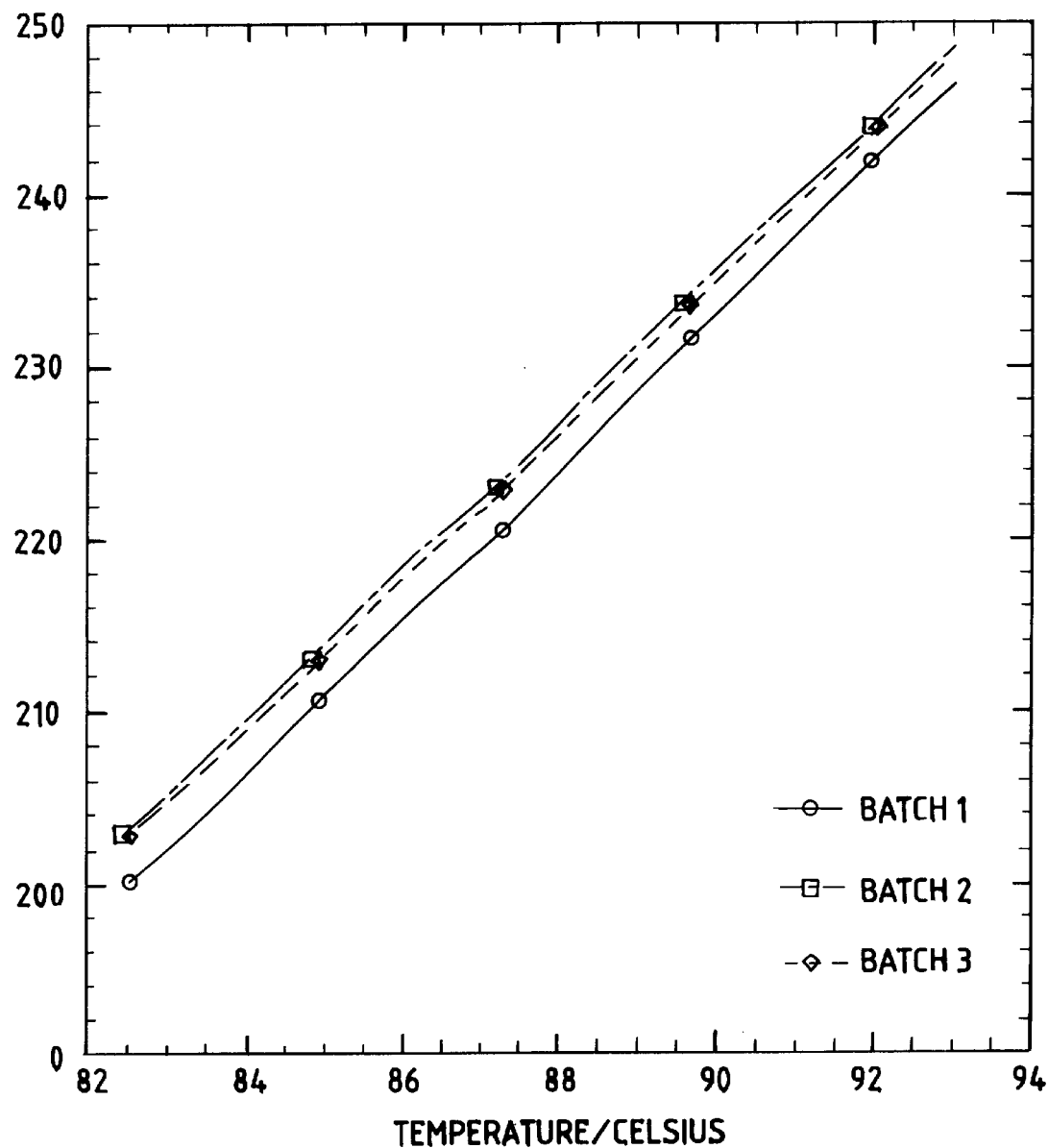
FIG. 6 is a temperature compensation graph for conductivity.

FIG. 6 illustrates conductivity values as a function of temperature for three different concentrations of MSP. As is illustrated in FIG. 6, a substantially linear relationship exits between conductivity and temperature. Tables 1-A, 1-B and 1-C illustrate the relationship between measured temperature, in the vicinity of the outflow port of mixing chamber 32 as well as the conductance meter 36 and the direct output from the conductance meter 36 (labeled "raw") as well as an associated temperature compensation value for each of 10 temperatures in connection with each of the three different concentrations of MSP.

The information of Tables 1-A, 1-B and 1-C representing compensation value vs. temperature can be stored in an appropriate table or tables for look-up and usage whenever a conductance value is read off of the meter 36. The meter 36 can, via the lines 40d read back either an adjusted conductance value or the raw conductance value as well as the temperature in which case the control unit 40 can extract the temperature coefficient associated with the sensed temperature, (from a pre-stored table) and then multiply the raw conductance value by the temperature compensation factor to obtain a normalized value independent of temperature.

FIG. 7 illustrates compensation factor vs. temperature where actual measure data points have been linerally related for interpolation purposes.

Tables 2-A, 2-B and 2-C illustrate temperature readings vs. raw conductance readings wherein compensation values associated with temperatures indicated with an asterisk have produced by interpolation as in FIG. 7. Thus, the linear relationship of compensation factor vs. temperature makes it possible to establish compensation values for temperatures beyond those where measurements were actually made. Thus, using the above information, a table of temperature vs. compensation coefficients can be stored in control unit 40 for purposes of adjusting the raw conductance values received from conductance meter 36.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The above described system and method can maintain the pH value of the output salt in a range of ±1% relative to the set-point value.

TABLE 1-A

Batch #1

|  | TEMP. | RAW | COMP. |
|---|---|---|---|
| Pt. 1 | 82.5 | 200 | 1 |
| Pt. 2 | 83.7 | 205.1 | 0.9751 |
| Pt. 3 | 84.9 | 210.6 | 0.9497 |
| Pt. 4 | 86.1 | 215.9 | 0.9263 |
| Pt. 5 | 87.3 | 220.5 | 0.9070 |
| Pt. 6 | 88.5 | 226.3 | 0.8838 |
| pt. 7 | 89.7 | 231.7 | 0.8632 |
| Pt. 8 | 90.9 | 237.2 | 0.8417 |

TABLE 1-A-continued

Batch #1

|  | TEMP. | RAW | COMP. |
|---|---|---|---|
| Pt. 9 | 92.0 | 242 | 0.8264 |
| Pt. 10 | 93.1 | 246.6 | 0.8110 |

TABLE 1-B

Batch #2

|  | TEMP. | RAW | COMP. |
|---|---|---|---|
| Pt. 1 | 82.4 | 202.80 | 1 |
| Pt. 2 | 83.6 | 207.90 | 0.9755 |
| Pt. 3 | 84.8 | 213.00 | 0.9521 |
| Pt. 4 | 86.0 | 218.60 | 0.9277 |
| Pt. 5 | 87.2 | 223.00 | 0.9094 |
| Pt. 6 | 88.4 | 228.40 | 0.8879 |
| Pt. 7 | 89.6 | 233.70 | 0.8678 |
| Pt. 8 | 90.8 | 238.90 | 0.8489 |
| Pt. 9 | 92.0 | 244.10 | 0.8308 |
| Pt. 10 | 93.2 | 249.20 | 0.8138 |

TABLE 1-C

Batch #3

|  | TEMP. | RAW | COMP. |
|---|---|---|---|
| Pt. 1 | 82.5 | 202.7 | 1 |
| Pt. 2 | 83.7 | 207.6 | 0.9764 |
| Pt. 3 | 84.9 | 212.9 | 0.9521 |
| Pt. 4 | 86.1 | 218.2 | 0.9290 |
| Pt. 5 | 87.3 | 222.8 | 0.9098 |
| Pt. 8 | 88.5 | 228.2 | 0.8883 |
| pt. 7 | 89.7 | 233.6 | 0.8677 |
| Pt. 8 | 90.9 | 238.9 | 0.8485 |
| Pt. 9 | 92.1 | 244.10 | 0.8304 |
| Pt. 10 | 93.0 | 248.0 | 0.8173 |

TABLE 2-A

Batch #1

|  | TEMP. | RAW | COMP. |
|---|---|---|---|
| Pt. 1 | 82.5 | 200 | 1 |
| Pt. 2 | 83.7 | 205.1 | 0.9751 |
| Pt. 3 | 84.9 | 210.6 | 0.9497 |
| Pt. 4 | 86.1 | 215.9 | 0.9263 |
| Pt. 5 | 87.3 | 220.5 | 0.9070 |
| Pt. 6 | 88.5 | 226.3 | 0.8838 |
| Pt. 7 | 89.7 | 231.7 | 0.8632 |
| Pt. 8 | 90.9 | 237.2 | 0.8417 |
| Pt. 9 | 92.1* | 242.4 | 0.8251 |
| Pt. 10 | 93.3* | 247.0 | 0.8097 |

*Adjusted linear interpolation

TABLE 2-B

Batch #2

|  | TEMP. | RAW* | COMP. |
|---|---|---|---|
| Pt. 1 | 82.5* | 203.2 | 1 |
| Pt. 2 | 83.7* | 208.3 | 0.9755 |
| Pt. 3 | 84.9* | 213.5 | 0.9518 |
| Pt. 4 | 86.1* | 219.0 | 0.9278 |
| Pt. 5 | 87.3* | 223.6 | 0.9088 |

TABLE 2-B-continued

Batch #2

| | TEMP. | RAW* | COMP. |
|---|---|---|---|
| Pt. 6 | 88.5* | 228.8 | 0.8881 |
| Pt. 7 | 89.7* | 234.1 | 0.8680 |
| Pt. 8 | 90.9* | 239.3 | 0.8491 |
| Pt. 9 | 92.1* | 244.6 | 0.8307 |
| Pt. 10 | 93.3* | 249.6 | 0.8141 |

*Adjusted linear interpolation

TABLE 2-C

Batch #3

| | TEMP. | RAW* | COMP. |
|---|---|---|---|
| Pt. 1 | 82.5 | 202.7 | 1 |
| Pt. 2 | 83.7 | 207.6 | 0.9764 |
| Pt. 3 | 84.9 | 212.9 | 0.9521 |
| Pt. 4 | 86.1 | 218.2 | 0.9290 |
| Pt. 5 | 87.3 | 222.8 | 0.9098 |
| Pt. 6 | 88.5 | 228.2 | 0.8883 |
| Pt. 7 | 89.7 | 233.6 | 0.8677 |
| Pt. 8 | 90.9 | 238.9 | 0.8485 |
| Pt. 9 | 92.1 | 244.10 | 0.8304 |
| Pt. 10 | 93.3* | 249.3 | 0.8131 |

*Adjusted linear interpolation

The invention claimed is:

1. A method of continuously preparing a liquid food additive comprising:
    continuously reacting a stream of a first liquid with a pH value less than about 6.00 with a stream of a second liquid with a pH value in excess of about 10.00 thereby producing a third liquid stream;
    monitoring an electrical parameter of the third stream wherein the parameter is indicative of a pH value thereof; and
    substantially continuously adjusting the flow of at least one of the first or second liquid streams in response to the monitored electrical parameter to maintain the pH value of the third liquid stream within a pre-set range thereby preparing the additive.

2. A method as in claim 1 which includes providing a continuous flow of the first and second liquid streams.

3. A method as in claim 1 which includes continuously delivering the third liquid stream to a selected location.

4. A method as in claim 3 which includes combining a food precursor with the third liquid stream at the location.

5. A method as in claim 1 which includes providing a pre-stored quantity of at least one of the liquids.

6. A method as in claim 1 wherein the monitoring step includes monitoring a conductance parameter of the third stream.

7. A method as in claim 1 wherein the monitoring step includes sampling the electrical parameter at a predetermined rate.

8. A method as in claim 1 wherein the adjusting step includes adjusting the flow in a plurality of increments at a predetermined adjustment rate.

9. A method as in claim 1 which includes monitoring the electrical parameter at a first rate and adjusting the flow at a second rate.

10. A method of preparing a food product comprising:
    providing a first liquid having a pH value less than about 6.0;
    providing a second liquid having a pH in excess of 10;
    providing a continuous flow of the first and second liquids;
    continuously combining and reacting the first and second liquids thereby producing a third liquid intended to have a predetermined pH value;
    monitoring an electrical parameter of the third liquid;
    adjusting the flow of at least one of the liquids in response to the monitored electrical parameter to maintain the pH value of the third liquid within a pre-set range which includes the predetermined pH value; and
    continuously delivering the third liquid to a food processor.

11. A method as in claim 10 wherein the third liquid has a conductance parameter indicative of the pH value thereof and wherein the monitoring step includes intermittently monitoring the conductance value.

12. A method as in claim 10 wherein the step of providing the first liquid is preceded by a step of storing a predetermined quantity of the first liquid.

13. A method as in claim 12 wherein the step of providing the second liquid is preceded by a step of storing a predetermined quantity of the second liquid.

14. A method as in claim 10 which includes establishing the predetermined pH value.

15. A method as in claim 14 which includes converting the predetermined pH value to a respective conductance value.

16. A method as in claim 10 which includes providing compensation for temperature variations while adjusting the flow.

* * * * *